United States Patent [19]

Freed

[11] 3,841,587

[45] Oct. 15, 1974

[54] VORTEX ARRESTOR AND VISUALIZATION SYSTEM

[76] Inventor: Lyle C. Freed, 5400 Pooks Hill Rd., Bethesda, Md. 20014

[22] Filed: Mar. 16, 1973

[21] Appl. No.: 341,922

[52] U.S. Cl............................ 244/40 A, 415/DIG. 1
[51] Int. Cl.......................... F15d 1/06, B64c 23/06
[58] Field of Search........ 244/1 R, 1 N, 40 R, 40 A, 244/41, 42 C, 42 CC, 42 CF, 130, 415/DIG. 1

[56] References Cited
UNITED STATES PATENTS

| | | | |
|---|---|---|---|
| 2,477,461 | 7/1949 | Lee | 244/40 R |
| 3,161,377 | 12/1964 | Balluff | 244/42 CF X |
| 3,480,234 | 11/1969 | Cornish | 244/40 R |
| 3,578,264 | 5/1971 | Kuethe | 244/41 |
| 3,596,854 | 8/1971 | Haney | 244/40 R |

Primary Examiner—Milton Buchler
Assistant Examiner—Barry L. Kelmachter
Attorney, Agent, or Firm—Jacob Shuster

[57] ABSTRACT

A nozzle mounted adjacent the tip of an aircraft wing projects rearwardly from its trailing edge into a region most susceptible to abatement of a vortex wake that otherwise develops during flight. Air under a static pressure higher than ambient is supplied to the nozzle and controllably heated to attain a velocity of supersonic value before discharge at high jet velocities from the nozzle causing abatement of early decay of the vortex.

16 Claims, 11 Drawing Figures

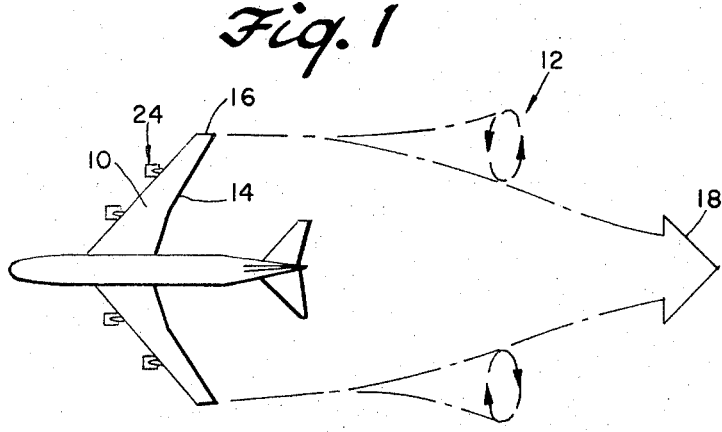
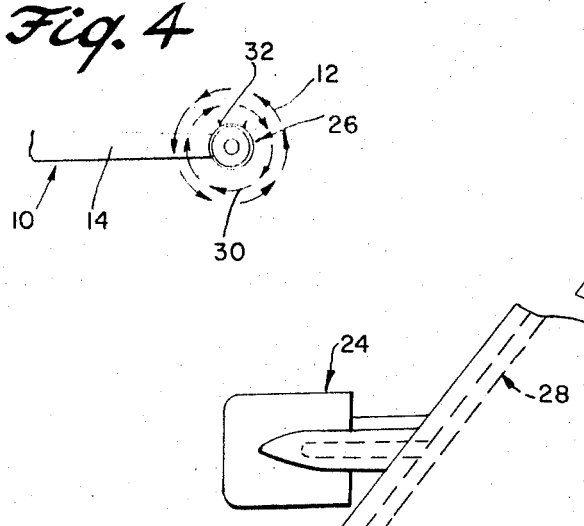
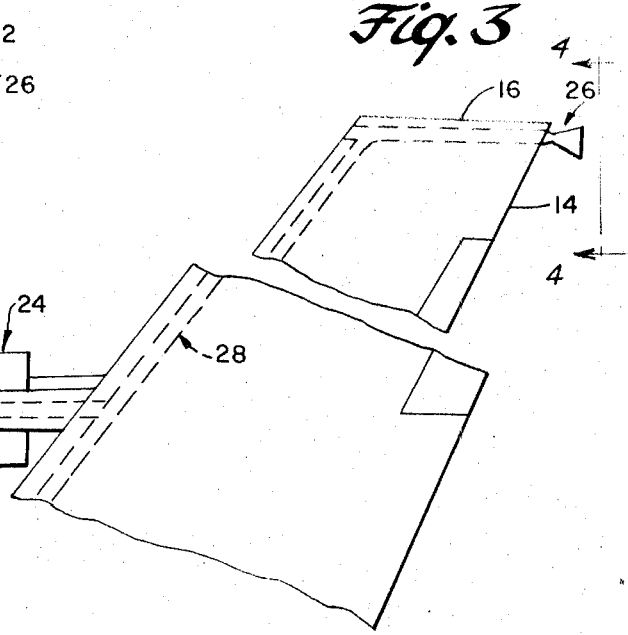
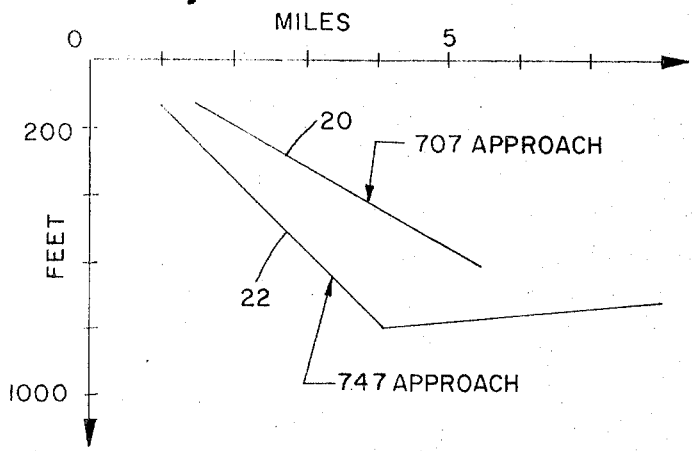

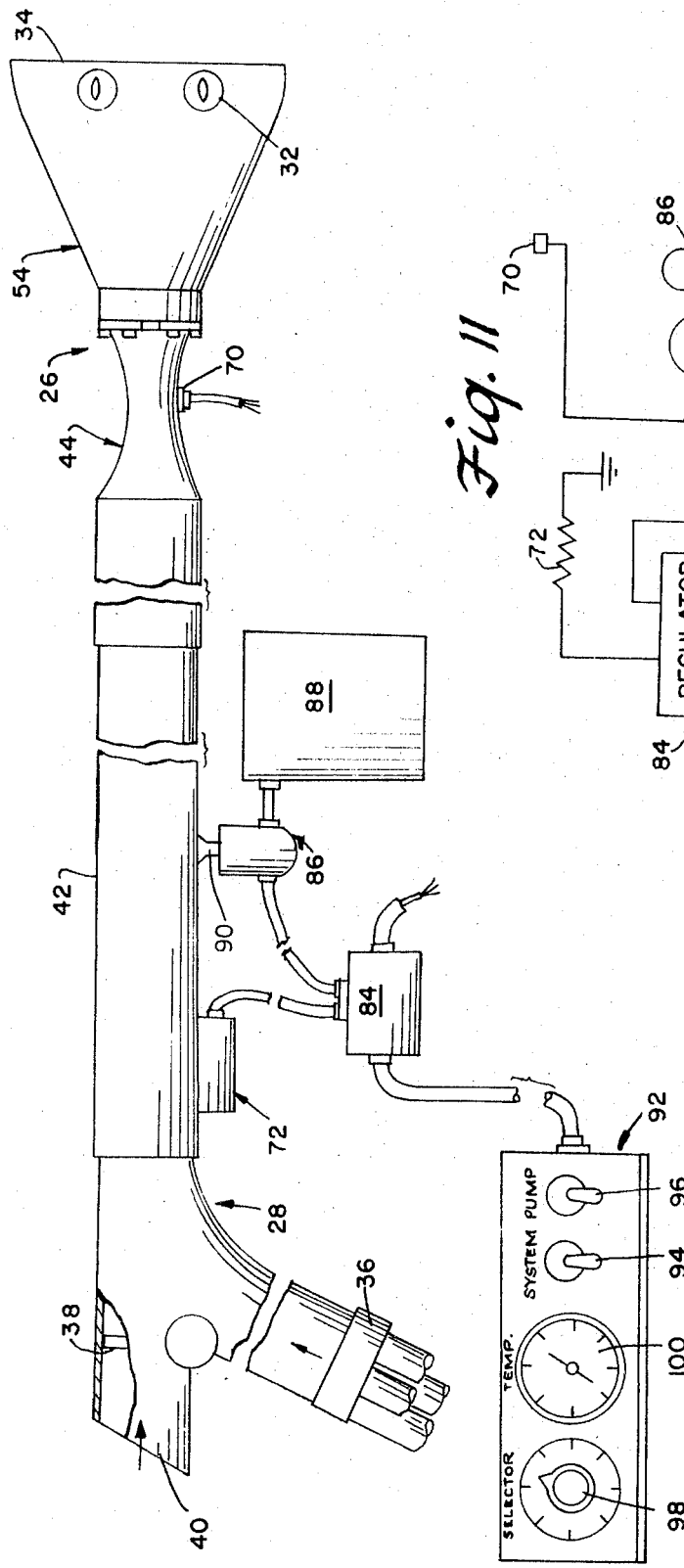
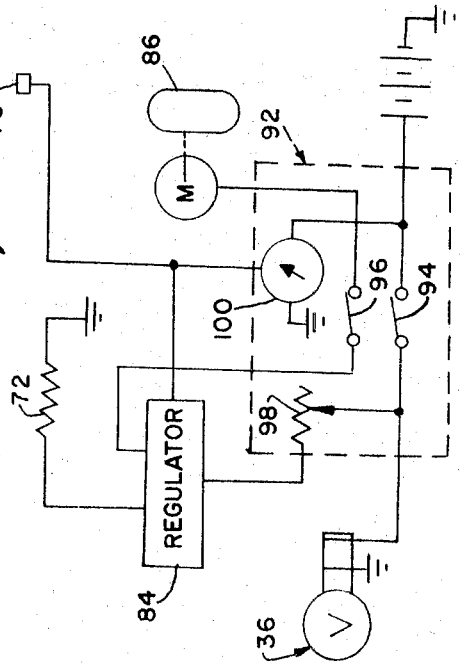
Fig. 11
Fig. 5

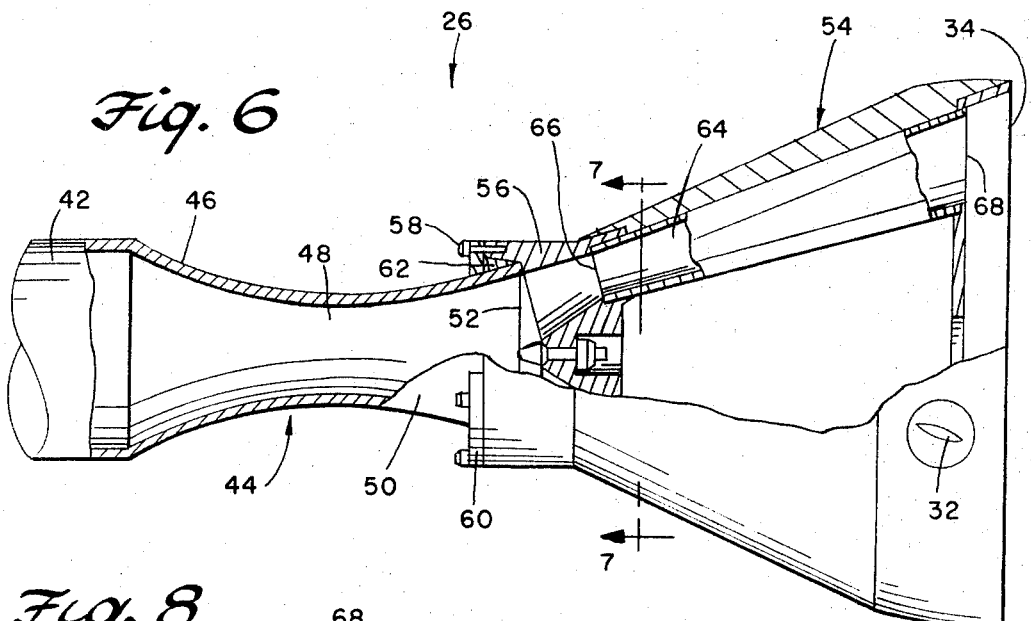
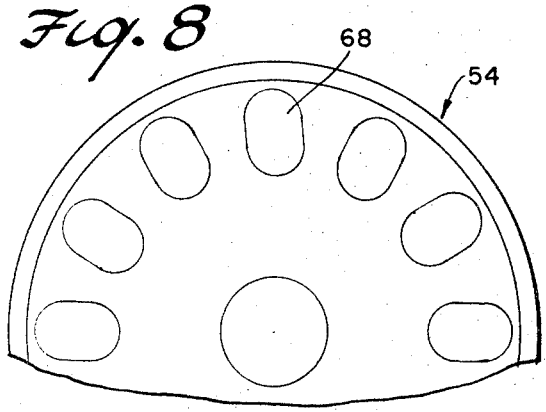
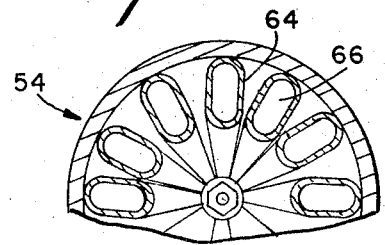
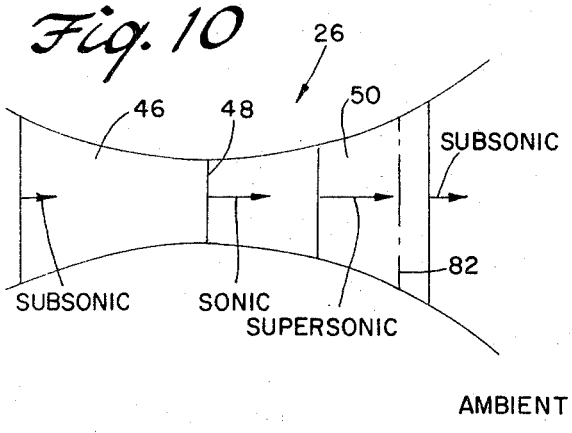
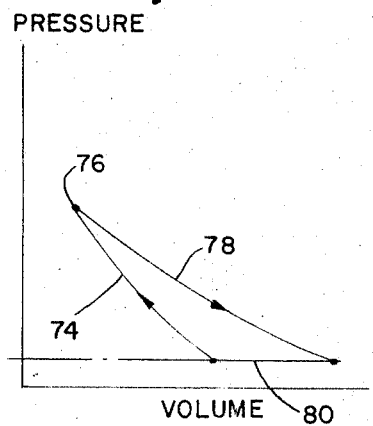

VORTEX ARRESTOR AND VISUALIZATION SYSTEM

This invention relates to the control of wing tip vortices and in particular to apparatus and a method for arresting, abating or causing rapid decay of such vortices.

Vortices or air disturbances at the tips of the wings of an aircraft in flight create a potential safety hazard at lower altitudes if allowed to develop during takeoff and landing because they form the nucleus of air masses in the jet exhaust and wing wakes characterized by high tangential velocities determined by variable aircraft configurations and altitudes and flight conditions peculiar to approach, departure, holding pattern and terminal control procedures. Such vortex systems extend a substantial distance rearwardly and downwardly from the generating aircraft and are responsible for regulatory separation procedures employed during controlled flight to avoid the hazard of turbulence to following aircraft especially during takeoff or landing operations. Flight operations at terminals are accordingly, restricted and airport capacity reduced. Efforts have therefore been made to devise systems for eliminating or arresting such vortices or vortex systems. The use of air injectors, vanes, jets, flaps and vortex generators on the wings have been proposed as possible solutions to the problem. Other proposals include the redesign of the wing shape and the attachment of drag devices such as parachutes and trailing bodies. Also, grounded devices at airports such as airjets, hedges and suction devices have been proposed. These solutions have not been adopted.

It is therefore an important object of the present invention to provide a wing tip mounted device that is relatively small, light in weight and easily mounted in or on the wing tip for effectively arresting the vortex during its formative stage without adversely affecting lift distribution over the wing. An additional object is to provide in combination with the vortex arresting device, visualization means for indicating the degree to which the vortex is abated.

In accordance with the present invention, a fixed geometry convergent-divergent or venturi type nozzle is mounted on each wing of an aircraft at the tip and projects by an adjusted amount rearwardly from the trailing edge into the region at which the vortex is formed. Air under a static pressure higher than ambient is supplied to the nozzle alternatively and/or sequentially from one or more sources available in the aircraft such as airbleed from airbleed ports on the compressor section of the jet engines, from the pneumatic distribution system, supplied from the airbleed ports or from a valve controlled ram air scoop. The air is conducted to the nozzle through a supply duct within which it is controllably heated so as to increase its flow velocity by an amount necessary to attain sonic velocity at the throat of the nozzle within which the air is accelerated. In this fashion the airflow velocity is made to increase to a maximum supersonic value in the divergent section of the nozzle while the air expands toward ambient pressure. Expansion continues through precisely dimensioned passages in an exhaust section from which the air exits at high jet velocities. The exhaust passages may be designed with a configuration inducing vortical flow of the air discharging in counter-rotating relation to the vortex being arrested.

Thus, the energy of the air in the supply duct is thermally increased by an optimum amount in order to cause a rapid decrease in its density and a corresponding increase in velocity with substantially no change in duct pressure. The air is then accelerated in the nozzle to sonic value under a static pressure above ambient before it undergoes expansion toward ambient pressure with a further increase in velocity to a maximum supersonic value. During further expansion through the exhaust passages, there is a transition from supersonic to subsonic velocity producing a shock wave which is emitted with the discharging air from the exit end of the exhaust passages. This is accompanied by an abrupt change in temperature and rapid increase in density of the air exiting into the vortex forming region. The foregoing effects either arrest the vortex or cause its early decay, augmented by the counter-rotating vortical flow induced by the configuration of the exhaust passages.

Injection of a suitable visualization agent into the supply duct upstream of the nozzle produces a visual wake pattern to indicate the condition and abatement of any vortex developing at the wing tip.

In the drawings:

FIG. 1 is a simplified top plan view of a typical aircraft in flight showing the wing tip vortex wake.

FIG. 2 is a graphical representation of the extent of the vortex wake associated with typical commercial aircraft.

FIG. 3 is a partial top plan view of an aircraft wing showing the system of the present invention installed.

FIG. 4 is a partial rear end view of the wing tip portion as viewed from section line 4—4 in FIG. 3.

FIG. 5 is a partial top plan view of the apparatus associated with the system of the present invention.

FIG. 6 is an enlarged top plan view of the nozzle assembly with parts broken away and shown in section.

FIG. 7 is a partial transverse sectional view taken substantially through a plane indicated by section line 7—7 in FIG. 6.

FIG. 8 is a partial rear end view of the nozzle assembly.

FIG. 9 is a graphical representation of the thermodynamic process associated with operation of the present invention.

FIG. 10 is a schematic representation of the flow relationships within the nozzle assembly.

FIG. 11 is a simplified electrical circuit diagram corresponding to the control system associated with the present invention.

Referring now to the drawings in detail, FIG. 1 diagrammatically illustrates the wing 10 of a typical aircraft in flight, and a vortex wake 12 originating from the trailing edge 14 of the wing adjacent the tip 16. The vortex wake 12 is characterized by a mass of air rotating counterclockwise as viewed rearwardly of the wing. The vortex wake produced by the other wing rotates in the opposite direction. When allowed to develop unabated, these vortex wakes converge rearwardly as shown by arrow 18 and contribute to a downward inclination of the air masses leaving the wings which has an effect on the lift distribution over the wings. The foregoing phenomona is well known by those skilled in the art and has been measured with respect to different aircraft in order to determine aircraft separation procedures for regulating operations. FIG. 2 graphically depicts, for example, the vortex wake patterns 20 and 22 for 707 and 747 commercial aircraft respectively in approach configurations. A horizontal separation between heavy and light aircraft of 5 miles for landings and 2 minutes for take-offs is accordingly called for by virtue of the foregoing data.

FIG. 3 illustrates in one installational embodiment, the system of the present invention applied to each of the wings 10 on which jet engines 24 are mounted. The wing and engine assembly could be associated, for example, with a 707 type of commercial aircraft. A nozzle assembly generally denoted by reference numeral 26 projects from the trailing edge 14 of each wing adjacent the tips 16 and thereby discharges air at high velocity into the region at which the vortex is formed. Air under a substantially constant static pressure above ambient is supplied to each nozzle assembly by a duct system 28. In the illustrated embodiment, the duct system, shown by dotted line, is built into the wing adjacent the leading edge and connected to the compressor airbleed ports of the jet engines 24 as the source of air under pressure. The present invention contemplates, however, deriving pressurized air from other sources as will be explained hereafter and mounting of the duct system at other locations either as part of the original aircraft structure or as subsequently fitted additions.

The discharge of air at high velocity from the nozzle assembly, the accompanying emergence of shock waves and the abrupt change in density and temperature of the air at the exit end of the nozzle assembly is responsible for the abatement or early decay of any vortex that may form. Further, to enhance the foregoing vortex arresting effects, the air being discharged from the nozzle assembly has a vortical flow component imparted thereto as indicated by arrows 30 in FIG. 4 which is in counter-rotating relation to the vortex 12 that would ordinarily develop. To apply the full affects of the vortex arresting action to the airflow off the wing tip, vortex generators 32 may be mounted externally on the nozzle assembly adjacent the exit end 34, as shown in FIGS. 4 and 5, so as to induce orderly vortex flow past the nozzle assembly.

The basic structural arrangement of the vortex arresting apparatus is shown in FIG. 5 and includes a valve controlled manifold assembly 36 through which pressurized air from different sources may be selectively admitted to the duct system 28 conducting the air to the nozzle assembly 26. A gate valve 38 also controls the supply of ram air from the scoop 40, exposed for example at the leading edge of the wing, to the longitudinally adjustable section 42 of the duct system to which the nozzle assembly 26 is connected.

Pressurized air is derived either directly from compressor airbleed ports or from the pneumatic distribution system which consists of systems for air start, cabin air recovery, air conditioning, power actuation, and thermal anti-icing. Compressor bleed from the jet engines 24 is more suitable because of the pressure, velocity, and heat energy content thereof.

Since the design point for jet engines is for optimum performance under cruise-thrust operations, airbleed from the engine compressor under partial load conditions during takeoff and landing and the lower altitude operations, for the purposes of this invention, also enhances overall engine efficiency. Anytime during climb or cruise operations, bleeding air directly from compressor ports can be cut off and air can be supplied either from the pneumatic distribution system or ram air from the scoop 40 through gate valve 38 which is automatically activated when internal system bleed air is cut off, or when ambient pressure exceeds that of the internal systems.

The gate valve 38 closes when the differential pressure from compressor airbleed sources is above ambient, and opens to admit the supply of ram air from scoop 40, when ambient pressure is greater.

The pressurized air supplied to the nozzle assembly 26 is accelerated by flow through acceleration section 44 as shown in FIGS. 5 and 6, which includes convergent portion 46 connected to the duct section 42, a throat passage 48 and a divergent portion 50 having an end chamber 52 with a flow area smaller than that of the inlet end of the convergent portion 46 so that air may continue to expand through an exhaust section 54 before it is discharged from the exit end 34 of the nozzle assembly. The body 56 of the exhaust section is removably secured to the acceleration section by a plurality of fasteners 58 extending through an annular plate 60 clamping a collar 62 at the end of section 44 to the body 56. Chamber 52 is in fluid communication with a plurality of stream tubes 64 of increasing flow passage area from the inlet ends 66 as more clearly seen in FIG. 6 to the outlet ends 68 as shown in FIG. 8. The flow stream tubes also have a spiral configuration so as to impart a vortical flow component to the discharge air in the desired rotational direction as aforementioned.

As shown in FIG. 5, a temperature sensor 70 such as a thermocouple, is mounted in the acceleration section of the nozzle assembly so as to sense the temperature of the air in the throat passage 48. The sensor 70 is operative through a heater 72 mounted on the duct section 42 upstream of the nozzle assembly, to control the amount of thermal energy in the airflow necessary to obtain acceleration of the air in the nozzle assembly to sonic velocity at the throat passage. The heater will thus heat the air to an optimum value causing a rapid decrease in its density and a corresponding increase in velocity with substantially no change in duct pressure. The thermodynamic process involved is graphically depicted in FIG. 9 as a constant pressure cycle wherein air flows through the duct system approaching the flow nozzle assembly as indicated by curve 74 until it reaches the heater and thermal energy is added at point 76. The air then expands as indicated by curve 78 until exhausted at ambient pressure as indicated during the exhaust phase 80. The amount of heat added will depend on the thermal energy content of the air supplied from the source. The sonic velocity attained at the throat 48 of the nozzle assembly as diagrammatically shown in FIG. 10, causes the airflow velocity to increase rather than decrease as the air expands through the divergent portion 50 of the nozzle assembly, a phenomona associated with flow near the speed of sound well known by those skilled in the art. Thus, the air continues to accelerate to a maximum supersonic velocity until a transition to subsonic velocity occurs as the exit end of the nozzle assembly is approached producing a shock wave denoted at 82 in FIG. 10. The air therefore emerges from the exit end of the nozzle assembly at a relatively high subsonic velocity accompanied by an abrupt decrease in the temperature of the air and a corresponding rapid increase in its density. This discharge from the nozzle assembly into the vortex formulating region, accounts for the abatement or early decay of any vortex.

With continued reference to FIG. 5, the heater 72 is controlled by a regulator 84 of a well known type in accordance with the signal current received from the sensor 70 to which it is wired. The regulator also controls operation of a pump 86 delivering a visualization agent stored in a tank 88 to a pressure spray nozzle injector 90 mounted on the duct section 42 downstream of the heater. The agent thereby injected into the airstream will upon discharge from the nozzle assembly 26 produce a visual pattern indicating the condition of any air stream wake. The agent selected is preferably a non-volatile, non-toxic, high flash point and low polluting fluid such as commercially available mineral oils rendered suitable for visualization purposes under the high temperature environment in the duct section 42 during operation. Paraffinic mineral oil, MLO–60–294, Naphtenic Mineral oil, MLO–7277, "Orinite 70." "Versilube F–50" are examples of such agents. By means of the regulator 84, operational control of pump 86 will limit injection of the visualization agent to periods when the temperature environment is suitable for producing the visualization pattern with the particular agent used. Activation of the visualization as well as the vortex arresting system, in accordance with requests from air traffic controllers or from other aircraft, will be controlled from the cockpit through a control panel 92. The control panel accordingly includes toggle switches 94 and 96 for respectively activating the system through the regulator 84 and the pump 86. The operating temperature for producing sonic airflow velocity at the throat of the nozzle assembly 26, is selected through the temperature control 98. The control panel also mounts a temperature gauge 100 through which temperature conditions may be monitored. A simplified version of the electrical control system corresponding to the arrangement of FIG. 5, is shown by the circuit diagram of FIG. 11. Thus, the system may be operated in accordance with the present invention to both arrest development of wing tip vortices and/or show the condition of any trailing wing tip air disturbances.

The geometrical design of the acceleration section of the nozzle assembly 26 necessary to accelerate airflow to sonic velocity at the throat under inlet flow conditions of the present invention, is in accordance with well known fluid dynamic and thermodynamic technology. Also, the optimum heat control is determined from temperature and velocity relationships at the nozzle throat, as follows:

| Temperature (° F) | Sonic Velocity (ft./sec.) |
|---|---|
| 140.3 | 1200.3 |
| 240.3 | 1295.1 |
| 340.3 | 1382.5 |
| 440.3 | 1463.6 |
| 540.3 | 1539.4 |
| 640.3 | 1610.8 |
| 740.3 | 1678.6 |
| 840.3 | 1743.2 |

Operation of the sensor 70, heating device 72 and regulator 84 is thus adjusted in accordance with the foregoing data.

It will also be appreciated that the exhaust section 54 is interchangeable with sections having other configurations such as eyelid deflection type nozzle sections that are actuated by fluid-mechanical or fluid-electrical means. The system may also be operated with or without the visualization means. The visualization means may be used not only to provide others with a visual reference for an operating system, but to also establish vortex patterns and parameters during test programs and to match a vortex arresting system to the peculiarities of a given aircraft on which it is being installed.

I claim:

1. A method of arresting a vortex that develops under ambient conditions at a predetermined point of origin, including the steps of: generating a source of gas under a static pressure higher than ambient; accelerating flow of said gas in the direction of the vortex; controllably heating the gas to increase the velocity thereof during acceleration to supersonic value; and volumetrically expanding the gas for discharge into the vortex at a subsonic velocity.

2. The method of claim 1 including the step of injecting a visualization agent into the gas for showing the condition of the vortex.

3. The method of claim 1 wherein the gas is heated under substantially constant static pressure conditions.

4. The method of claim 3 wherein the gas is accelerated by passage through a venturi nozzle.

5. The method of claim 4 including the step of injecting a visualization agent into the gas for showing the condition of the vortex.

6. Apparatus for controlling a vortex produced at the trailing edge of an airfoil, comprising a convergent-divergent nozzle device extending rearwardly from said airfoil, a source of gas under pressure, duct means for conducting said gas to the nozzle device, and thermal control means connected to the duct means for maintaining a predetermined static pressure internally of the nozzle device to increase flow velocity to supersonic value within the nozzle device thereby discharging the gas to arrest development of the vortex.

7. The combination of claim 6 including means for injecting a visual agent into the gas upstream of the nozzle device.

8. The combination of claim 6 wherein said source of gas under pressure constitutes an engine driven compressor and means for bleeding air under pressure from the compressor.

9. The combination of claim 6 wherein said nozzle device includes discharge passage means for inducing vortical flow of the discharging gas in counter-rotating relation to the vortex being arrested.

10. The combination of claim 6 including means mounted externally on the nozzle device for insuring orderly vortex flow rearwardly from the trailing edge of the airfoil.

11. The combination of claim 6 wherein said source of gas includes a propelling engine of an aircraft within which intake air is compressed and means for bleeding compressed air from said engine during flight below cruising speeds.

12. The combination of claim 11 wherein said source of gas further includes scoop means mounted by the aircraft for producing ram pressurized air during flight and means for selectively supplying the pressurized air to the duct means.

13. In combination with the wing of an aircraft from which a vortex develops along a trailing path from the wing tip during flight, means for arresting development of said vortex comprising nozzle means mounted on said wing adjacent the tip and extending rearwardly therefrom for discharge of air along said trailing path, a source of air under pressure connected to said nozzle means, and control means connected to said source for maintaining a static pressure of the air internally of the nozzle means substantially above the external ambient pressure, said control means including a heating device for increasing the temperature of the air upstream of the nozzle means.

14. The combination of claim 13 including means for injecting a visual agent into the air downstream of the heating device.

15. The combination of claim 13 wherein said nozzle means includes a flow accelerating section having an inlet end, a throat passage and an outlet end of reduced flow area relative to the inlet end, said flow accelerating section being dimensioned to increase the flow velocity of the air from said source to substantially sonic value at the throat passage under said internal static pressure.

16. The combination of claim 15 wherein the nozzle means further includes an expanding exhaust section discharging the air from the outlet end of the flow accelerating section, said exhaust section including passage means for inducing vortical flow of the discharging air in counter rotating relation to the vortex being arrested.

* * * * *